United States Patent [19]

Hirasawa

[11] Patent Number: 4,954,911
[45] Date of Patent: Sep. 4, 1990

[54] REPRODUCING APPARATUS HAVING A MECHANISM FOR COMPENSATING TIME-BASE FLUCTUATIONS

[75] Inventor: Masahide Hirasawa, Kanagawa, Japan

[73] Assignee: Canon Kabushiki Kaisha, Tokyo, Japan

[21] Appl. No.: 453,062

[22] Filed: Dec. 8, 1989

Related U.S. Application Data

[63] Continuation of Ser. No. 166,769, Mar. 4, 1988, abandoned, which is a continuation of Ser. No. 805,960, Dec. 5, 1985, abandoned.

[30] Foreign Application Priority Data

Dec. 7, 1984 [JP] Japan .............................. 59-257332
Mar. 15, 1985 [JP] Japan .............................. 60-50628

[51] Int. Cl.$^5$ .............................................. H04N 9/89
[52] U.S. Cl. ...................................... 358/323; 360/26; 360/27; 360/36.1; 360/77.14
[58] Field of Search ..................... 358/320, 323, 337; 360/8, 9.1, 10.2, 26–28, 36.1, 77.01, 77.12–77.14

[56] References Cited

U.S. PATENT DOCUMENTS

| | | | |
|---|---|---|---|
| 3,609,223 | 9/1971 | Tajiri et al. | 358/323 |
| 4,034,397 | 7/1977 | Trost | 358/323 |
| 4,084,176 | 4/1978 | Trost | 358/323 |
| 4,439,799 | 3/1984 | Haubrich et al. | 360/10.2 X |
| 4,497,000 | 1/1985 | Terada et al. | 360/77 X |
| 4,509,083 | 4/1985 | Nakano | 360/77 |
| 4,550,345 | 10/1985 | Terada et al. | 358/323 |

Primary Examiner—Alan Faber
Assistant Examiner—W. R. Young
Attorney, Agent, or Firm—Toren, McGeady & Associates

[57] ABSTRACT

A reproducing apparatus for reproducing a recording from a record bearing medium on which a plurality of different pilot signals having different frequencies are recorded in rotation along with an information signal, one in each of recording tracks of the record bearing medium in a predetermined sequence, in which the signals recorded in each of the recording tracks on the record bearing medium are reproduced, that the pilot signal including a time-base fluctuation component out of the reproduced signals is converted into one frequency signal including the time-base fluctuation component, that a comparison signal is obtained by comparing the converted signal with a reference signal, and that the time-base fluctuation component of the information signal is eliminated in accordance with the comparison signal.

15 Claims, 4 Drawing Sheets

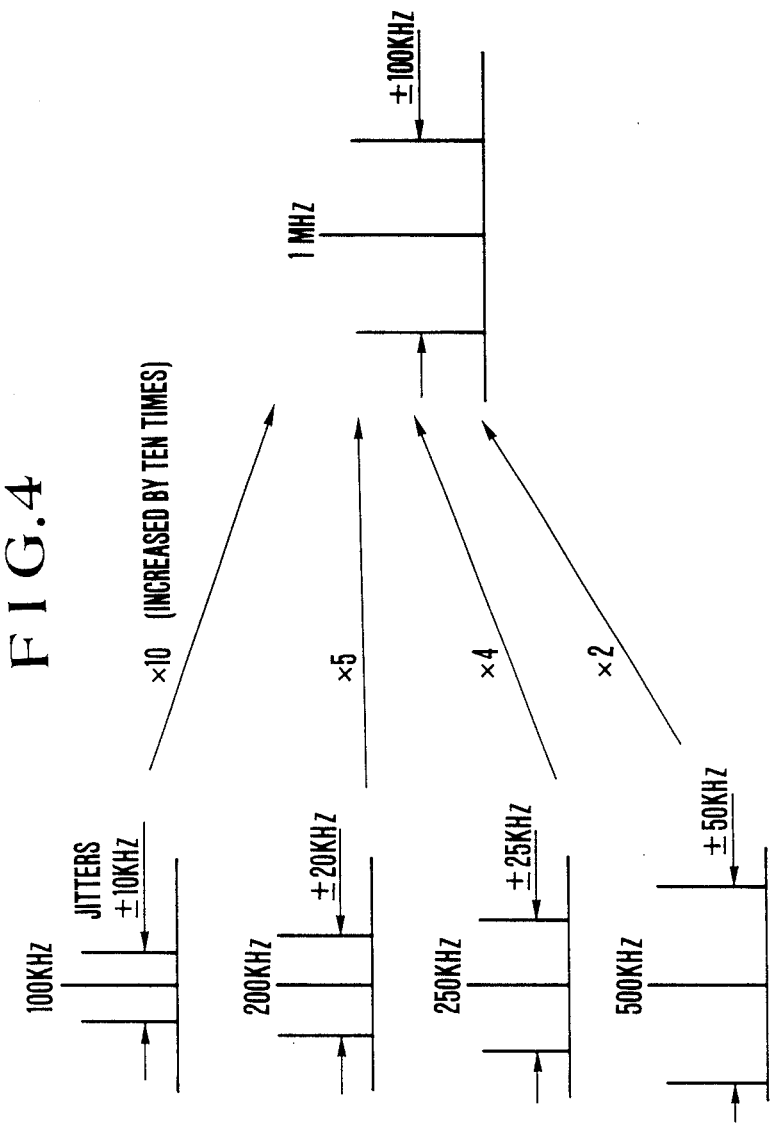

REPRODUCING APPARATUS HAVING A MECHANISM FOR COMPENSATING TIME-BASE FLUCTUATIONS

This is a continuation application of Ser. No. 07,166,769, filed Mar. 4, 1988, now abandoned, which is a continuation of application Ser. No. 06,806,960, , filed Dec. 5, 1985, now abandoned.

BACKGROUND OF THE INVENTION

1. Field of the Invention

This invention relates to a reproducing apparatus for reproducing a record from a record bearing medium on which a plurality of different pilot signals having different frequencies are recorded in rotation along with an information signal, one in each of recording tracks in a predetermined sequence.

2. Description of the Prior Art

Generally, deterioration of information signals reproduced by the apparatus of the above-stated kind includes deterioration in the S/N ratio, time-base fluctuations or jitter, etc. Meanwhile, in order to correct a tracking error, there has been proposed a method, wherein different control signals which have different frequencies are consecutively recorded by frequency superimposing them on an information signal to be recorded, one in every recording track formed on a record bearing medium; and in reproducing the recorded information signal, a tracking error is detected by using these control signals. As for the time-base fluctuations (or jitter), the jitter is corrected by using control signals which have been added beforehand to the information signal to be recorded.

In reproducing a recorded video signal, for example, it is a chrominance signal therein that is most seriously affected by jitter. To mitigate the influence of the jitter, it has been practiced to extract a color-burst signal included in a reproduced chrominance signal for every horizontal scanning period (1H) and the jitter component of the extracted colorburst signal is detected and removed for lessening the adverse effect of jitter on the basis of the detected component. However, with the jitter component detected and removed by periodically taking out some representative part of the signal in accordance with the prior art arrangement, it is hardly possible to detect and remove such jitter, that arise at parts outside of a sampling period. Therefore, it has been hardly possible to adequately remove the adverse effect of jitter.

SUMMARY OF THE INVENTION

A general object of the present invention is to provide a reproducing apparatus which is capable of preventing deterioration of a reproduced information signal with a simple arrangement.

A more specific object of the invention is to provide a reproducing apparatus wherein, in correcting time-base fluctuations of a reproduced information signal, the time-base fluctuations can be continuously corrected without recourse to any special control signals for that purpose.

Another object of the invention is to provide a reproducing apparatus which is capable of accurately accomplishing a continuous corrective operation on time-base fluctuations.

Under these objects, a reproducing apparatus arranged according to this invention to reproduce a record from a record bearing medium on which a plurality of different pilot signals having different frequencies are recorded in rotation along with an information signal, one in each of recording tracks in a predetermined sequence, comprises: reproducing means for reproducing signals recorded in the recording tracks on the record bearing medium; converting means for converting the pilot signals included in the reproduced signals which are reproduced by the reproducing means with a time-base fluctuation component included therein into one frequency signal including the time-base fluctuation component; reference signal generating means for generating a reference signal; comparison means arranged to compare the reference signal generated by the reference signal generating means with the signal produced from the converting means and to produce a comparison signal; and correcting means arranged to correct, according to the comparison signal produced from the comparison means, the information signal reproduced by the reproducing means.

The above and further objects and features of this invention will become apparent from the following detailed description of embodiments thereof taken in connection with the accompanying drawings.

BRIEF DESCRIPTION OF THE DRAWINGS

FIG. 4 is an illustration showing frequency deviation resulting from jitter.

DETAILED DESCRIPTION OF THE PREFERRED EMBODIMENTS

In the embodiment described below, this invention is applied to a video tape recorder (hereinafter referred to as VTR) of the kind which corrects a tracking error in accordance with the so-called four-frequency method using control signals of four different frequencies.

Figure 1:
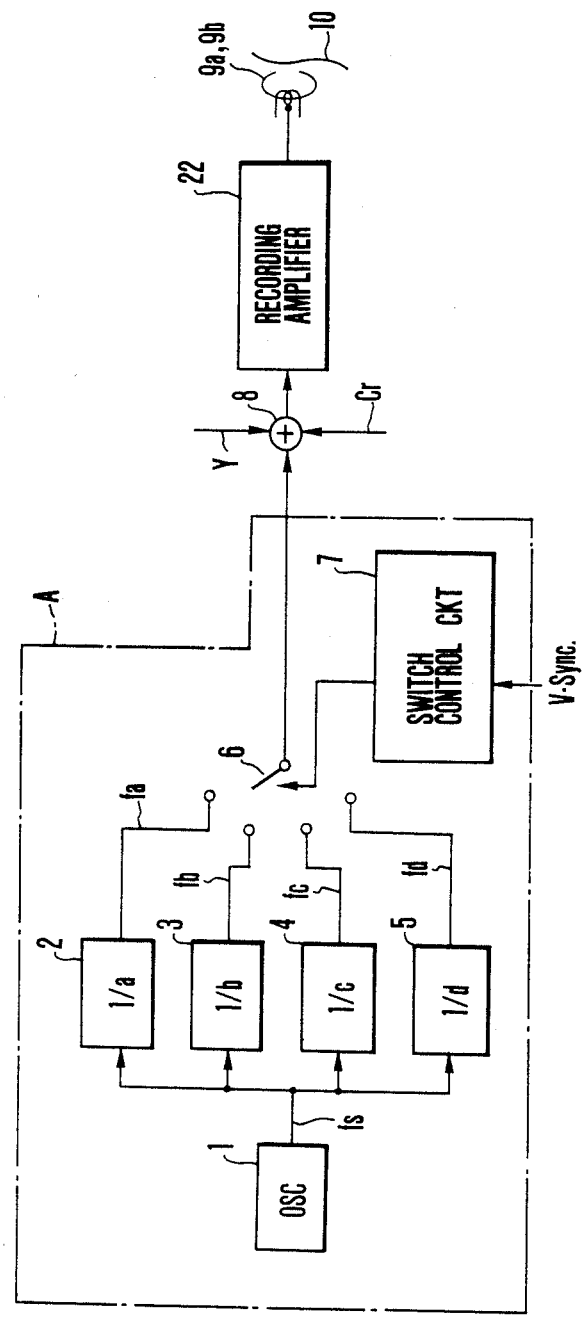
FIG. 1 is a block diagram showing control signal generating means and related parts of an embodiment of this invention.

FIG. 1 shows, in a block diagram, the essential parts of a recording circuit including control signal generating means A, which is arranged to generate four different kinds of control signals. The illustration includes a reference signal generator (OSC) 1 which is arranged to generate a reference signal fs; frequency dividing circuits 2, 3, 4 and 5 which are arranged to frequency divide this reference signal fs by 1/a, 1/b, 1/c and 1/d to obtain control signals of four different frequencies fa, fb, fc and fd, respectively; a switch 6 which is arranged to selectively produce one of the outputs of these frequency dividing circuits 2, 3, 4 and 5; and a switch control circuit 7 which is arranged to shift the connecting position of the switch 6 according to a vertical synchronizing signal (hereinafter referred to as V-SYNC) in a predetermined sequence. These elements jointly form the above-stated control signal generating means A. An addition circuit 8 is arranged to combine the control signals fa, fb, fc and fd which are produced via the switch 6 with a luminance signal Y and a chrominance signal Cr.

Figure 2:
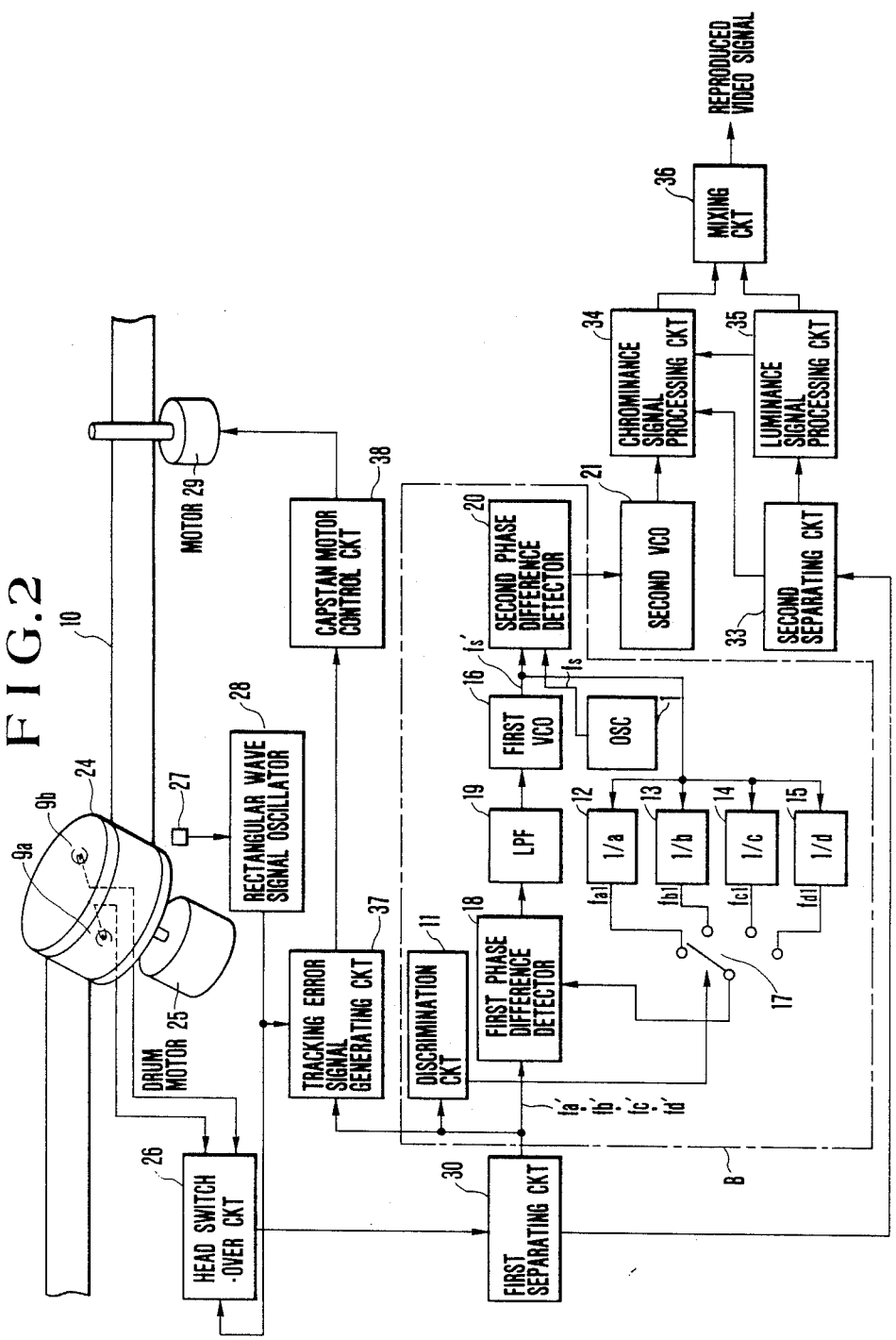
FIG. 2 is a block diagram showing detecting means, correcting means, etc., of the embodiment of this invention.

FIG. 2 shows, in a block diagram, the essential parts of a reproducing circuit of the embodiment. The reproducing circuit includes detecting means B for detecting any time-base fluctuations that arise during a reproducing operation through the above-stated control signals of four different frequencies fa, fb, fc and fd; and correcting means for correcting the time base fluctuations according to the result of detection made by the detecting means B. Magnetic heads 9a and 9b are arranged on a rotary drum 24 to reproduce the control signals of four different frequencies fa', fb', fc'and fd' which are recorded on a magnetic recording tape 10. The rotary drum 24 is positioned in slanted relation to the magnetic tape 10 and is arranged to be rotated by a drum motor 25. The magnetic heads 9a and 9b obliquely trace the magnetic tape 10 in reproducing the signals. A head switch-over circuit 26 is arranged to produce a continuous reproduced signal by alternately producing reproduced signals obtained from the magnetic heads 9a and 9b. The switching operation of the head switchover circuit 26 on the outputs of the magnetic heads 9a and 9b is performed upon receipt of every edge part of a rectangular wave signal produced from a rectangular wave signal generator 28 in synchronism with the rotating period of the rotary drum 24 which is detected by a rotation period detector 27. A first separating circuit 30 is arranged to separate the reproduced signal produced from the head switch-over circuit 26 into an information signal and control signals. A discrimination circuit 11 is arranged to detect, from the output of the head switch-over circuit 26, which of the control signals is mainly taken out through the magnetic heads 9a and 9b. Frequency dividing circuits 12, 13, 14 and 15 are arranged to frequency divide a reproduction reference signal fs' produced from a first voltage controlled oscillator (hereinafter referred to as VCO) 16. These frequency dividing circuits 12, 13, 14 and 15 produce signals fa1, fb1, fc1 and fd1 which are obtained by frequency dividing the signal fs' by 1/a, 1/b, 1/c and 1/d, respectively. A switch 17 is arranged to selectively take out one of these signals fa1, fb1, fc1 and fd1. The switching or selecting operation of the switch 17 is performed on the basis of the result of discrimination made by the discrimination circuit 11. A first phase difference detector 18 is arranged to detect a phase difference between each of the signals fa1, fb1, fc1 and fd1 taken out by this switch 17 and each of the four different kinds of control signals fa', fb', fc'and fd' which are reproduced by the magnetic heads 9a and 9b. The output of the detector 18 is supplied via a lowpass filter (LPF) 19 to the above-stated first VCO 16 as a control input thereof. A second phase difference detector 20 is arranged to detect a phase difference between the reproduction reference signal fs' produced from the first VCO 16 and a reference signal fs which is produced from the above-stated OSC 1. The detecting means B is composed of the above-stated circuit elements 1 and 11 to 20. A second VCO 21 is arranged to have its oscillation frequency under the control of the output of the second phase difference detector 20. Under this control, the frequency signal produced from the second VCO 21 is synchronized with the reference signal fs which is produced from the above-stated OSC 1. A second separating circuit 33 is arranged to separate the information signal reproduced by the magnetic heads 9a and 9b into a luminance signal and a chrominance signal. The chrominance signal which is separated by the separating circuit 33 is supplied to a chrominance signal processing circuit 34. The luminance signal which is also separated by the circuit 33 is supplied to a luminance signal processing circuit 35 to be brought back to its original frequency band through a reproduced signal processing operation of the circuit 35. At the same time, a horizontal synchronizing signal is separated from the reproduced luminance signal and is supplied to the chrominance signal processing circuit 34. At the chrominance signal processing circuit 34, a reproduced signal processing operation including frequency conversion, etc., is carried out on the reproduced chrominance signal by using the output of the second VCO 21 and the horizontal synchronizing signal which is obtained from the reproduced luminance signal. Through this operation, the reproduced signal is brought back to its original frequency band. The luminance and chrominance signals which are thus processed are mixed together at a mixing circuit 36 and are thus made into a reproduced video signal. A tracking error signal generating circuit 37 is arranged to produce a tracking error signal by using the control signals reproduced by the magnetic heads 9a and 9b. A capstan motor control circuit 38 is arranged to control a capstan motor 29 according to the tracking error signal.

With a recording and/or reproducing apparatus arranged in accordance with this invention as described above, a recording operation is performed as follows: Referring to FIG. 1, the reference signal fs, which is produced from the OSC 1, is frequency divided by 1/a, 1/b, 1/c and 1/d, respectively, by the frequency dividing circuits 2, 3, 4 and 5 to obtain the control signals of four different frequencies fa, fb, fc and fd. These control signals fa, fb, fc and fd are taken out one by one in a predetermined sequence via the switch 6 for every recording tracks, that is, at intervals of one field period. These control signals are supplied to the adder 8, which superimposes these control signals fa, fb, fc and fd on the luminance signal Y and the chrominance signal Cr. The output of the adder 8 is recorded on the record bearing medium 10 which is a magnetic tape or the like via a recording amplifier 22 and the magnetic heads 9a and 9b. With recording performed in this manner, a reproducing operation is performed in the following manner:

Referring to FIG. 2, in the reproducing operation, the control signals are reproduced by the magnetic heads 9aand 9b from the magnetic tape 10 as reproduced control signals fa', fb', fc'and fd'. The reproduced control signals are supplied to the tracking error signal generating circuit 37. Then, a tracking error is corrected in the same manner as in the conventional apparatus.

Further, the reproduced control signals fa', fb',fc' and fd', which are obtained in the manner as mentioned above, are supplied to the discrimination circuit 11 and the first phase difference detector 18. At the circuit 11, the frequency of the reproduced control signals fa', fb', fc'and fd', which varies at every one-field period is detected. The switch 17 is shifted from one position to another according to the result of detection. By this, one of the signals fa1, fb1, fc1 and fd1 produced from the frequency dividing circuits 12, 13, 14 and 15 is selectively taken out. Following this, the phases of the signals fa1, fb1, fc1 and fd1 are compared by the first phase difference detector 18 with those of the reproduced control signals fa', fb', fc'and fd', respectively. As a result, a phase error voltage is obtained and applied via the LPF 19 to the first VCO. The first VCO 16 then produces, according to this phase error voltage, a signal of a predetermined frequency the center frequency of which is obtained by stepwise multiplying the frequency of each of the reproduced control signals fa', fb', fc' and fd' by a, b, c or d. This signal from the first VCO 16 is a reproduction reference signal fs' which includes therein a jitter component representing jitter occurring during reproduction. That is, the first VCO 16 is arranged to produce the reproduction reference signal fs' having a unified frequency component including the jitter component occurring during reproduction. This signal fs' is supplied to the second phase difference detector 20 to have its phase compared with that of the reference signal fs which is employed at the time of recording. With a phase difference between the two signals thus obtained, the detector 20 produces a signal corresponding to this phase difference.

Generally, the width of frequency deviation due to jitters increases, accordingly, as the predetermined frequency of a reproduced signal is arranged to be higher. In case where a jitter detecting signal has a plurality of frequencies, therefore, it is considered necessary to have a plurality of signal processing circuits. However, since the ratio of this width of deviation to the frequency of the reproduced signal (the amount of jitters) remains unvaried irrespective of the kinds of frequencies, the arrangement of this embodiment to multiply stepwise the four frequencies of the control signals up to a common multiple of them equalizes, as in the case of FIG. 4, the deviation widths of all the four frequencies through that stepwise multiplication. Accordingly, the phase comparison can be consecutively accomplished by means of a single phase comparison circuit. Further, FIG. 4 shows a case where the amount of jitter is ±10% of the reproduced frequency.

The oscillation frequency of the frequency signal generated by the second VCO 21 is controlled according to the phase difference voltage produced from the second phase difference detector 20. Therefore, the output of the second VCO 21 is used in carrying out a reproduced signal processing operation such as frequency conversion, etc., on the reproduced chrominance signal at the chrominance signal processing circuit 34. By this arrangement, the jitter component of the reproduced chrominance signal can be consecutively corrected. The reproduced luminance signal, which is separated from the reproduced information signal at the second separating circuit 33 and is then subjected to the reproduced signal processing operation of the luminance signal processing circuit 35, is supplied to a mixing circuit 36 along with the corrected chrominance signal produced from the chrominance signal processing circuit 34. The mixing circuit 36 mixes them into a reproduced video signal and produces it therefrom.

Figure 3:
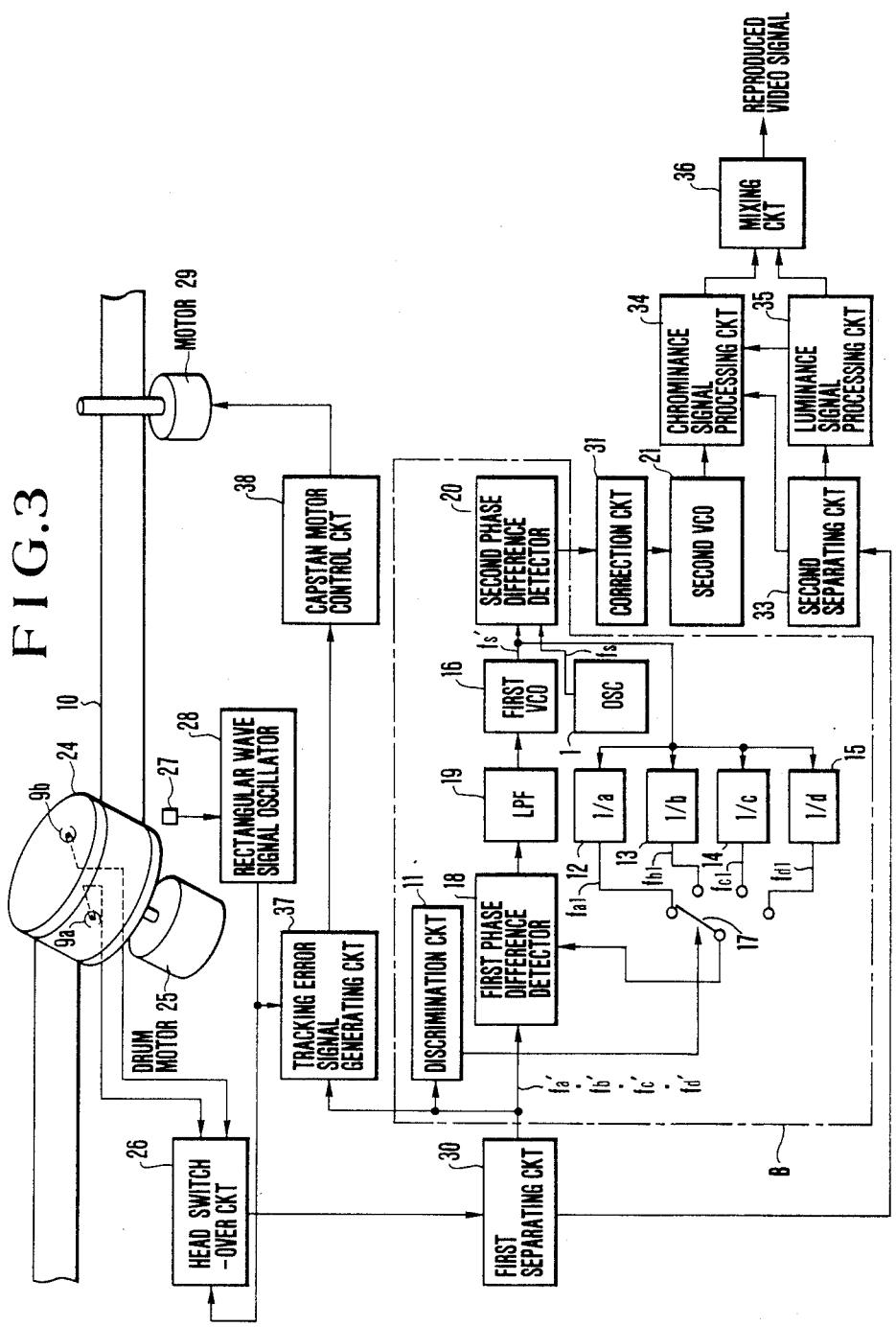
FIG. 3 is a block diagram showing another embodiment of this invention.

Another embodiment of this invention is arranged as shown in FIG. 3. This illustration shows, in a block diagram, the essential circuit elements of the reproducing circuit arrangement of the embodiment including: detecting means B which is arranged to detect time-base fluctuations by means of control signals of four different frequencies fa, fb, fc and fd when the time-base fluctuations arise during a reproducing operation; and correcting means for correcting the time-base fluctuations according to the result of detection made by the detecting means B. In FIG. 3, the parts which are similar to those shown in FIG. 2 are indicated by the same reference numerals. In the preceding embodiment shown in FIG. 2, the fluctuations in deviation width due to frequency fluctuations are arranged to be removed by multiplying the frequencies of the control signals up to a common multiple. However, in the event that the frequency of the control signal deviates from the predetermined frequency value at the time of recording, a deviation arises in the phase difference voltage of the second phase difference detector 20. This deviation is considered to result, among others, from (1) the frequency dividing error of the frequency dividing circuit 2, 3, 4 or 5; (2) a deviation in the oscillation frequency of the OSC 1; and/or (3) fluctuations of the oscillation frequency on the time base. Of these conceivable causes, the cause (3) is regarded as jitter. This can be corrected during reproduction at the second VCO 21 and the chrominance signal processing circuit 34. In the cases of the possible causes (1) and (2), there arises no time-base fluctuation although there is a deviation in the frequency. Therefore, they are not regarded as jitter.

In view of the above, the embodiment shown in FIG. 3 is arranged as follows: During reproduction, the second phase difference detector 20 detects a phase difference between the reference signal fs and the reproduction reference signal fs' and produces a voltage corresponding to the detected phase difference. This phase-difference-representing voltage includes a certain fixed deviation component on the time base. To detect this deviation component, therefore, there is provided a correction circuit 31 which includes a capacitor. This deviation component remains unchanged on the time base. The phase-difference-representing voltage of the second phase difference detector 20 produced for this deviation, therefore, is a low frequency component not exceeding 15 Hz or thereabout. In other words, any erroneous action of the second VCO 21 due to this deviation can be prevented by cutting off the above-stated low frequency component by means of the correction circuit 31, acting as a low-cut filter which includes the capacitor, with a phase-difference voltage that corresponds solely to jitter supplied to the second VCO 21.

In accordance with the arrangement of this embodiment, the output signal of the second phase difference detector 20 including a deviation component is passed through the correction circuit 31 which includes the capacitor to correct the deviation component of the output of the detector 20. Then, a phase difference voltage without any deviation component can be supplied to the second VCO 21. Following this, a signal processing operation is carried out, in the same manner as in the case of the preceding embodiment, to produce a reproduced video signal.

What is claimed is:

1. A reproducing apparatus for reproducing a recording form a record bearing medium on which a plurality of different pilot signals having different frequencies are recorded in rotation along with an information signal, one in each of recording tracks of said record bearing medium in a predetermined sequence, comprising:
 (a) reproducing means for reproducing signals recorded in each of said recording tracks formed on said record bearing medium;
 (b) converting means for converting said pilot signals which are reproduced by said reproducing means including a time-base fluctuation component therein into one frequency signal including said time-base fluctuation component;
 (c) reference signal generating means for generating a reference signal;
 (d) comparison means arranged to compare said reference signal produced from said reference signal generating means with a signal produced from said converting means to obtain a comparison signal; and (e) eliminating means for eliminating said time-base fluctuation component of said information signal reproduced by said reproducing means in accordance with said comparison signal produced from said comparison means.

2. An apparatus according to claim 1, wherein said converting means includes:
   (a) stepwise multiplying means for stepwise multiplying pilot signals reproduced by said reproducing means including jitter; and
   (b) control means arranged to detect the kind of each of said pilot signals reproduced by said reproducing means and to control the stepwise multiplying rate of said stepwise multiplying means according to the result of said detection.

3. An apparatus according to claim 1, wherein said comparison means further includes removing means for removing a low frequency component of said comparison signal.

4. A reproducing apparatus for reproducing a recording from a record bearing medium on which a plurality of different pilot signals having different frequencies are recorded, in rotation, superimposed with an information signal, one in each of recording tracks of said record bearing medium in a predetermined sequence, comprising:
   (a) reproducing means for reproducing from said record bearing medium said information signal with said superimposed pilot signals by tracing a surface of said record bearing medium;
   (b) separating means for separating a reproduced signal obtained from said reproducing means into said pilot signals and said information signal;
   (c) tracking control means for performing tracking control over the tracing operation of said reproducing means on said record bearing medium by using said pilot signals separated by said separating means;
   (d) detecting means for detecting the time-base fluctuations of said information signal produced by said reproducing means, said detecting operation being performed by using said pilot signals separated by said separating means; and
   (e) removing means for removing the time-base fluctuations of said information signal reproduced by said reproducing means in accordance with the result of detection made by said detecting means.

5. An apparatus according to claim 4, wherein said pilot signals used for tracking control are arranged to have four different frequencies.

6. An apparatus according to claim 5, wherein said detecting means includes:
   (a) comparison signal generating means for generating a comparison signal;
   (b) frequency dividing means for dividing the frequency of said comparison signal so as to produce a plurality of frequency signals each having a different frequency;
   (c) first phase difference detecting means for detecting a phase difference between one of said pilot signals and a corresponding one of said frequency signals so as to control a center frequency of said comparison signal to be generated by said comparison signal generating means in accordance with the result of the phase difference detection;
   (d) reference signal generating means for generating a reference signal; and
   (e) second phase difference detecting means for detecting a phase difference between said comparison signal and said reference signal in the form of a degree of time-base fluctuations.

7. An apparatus according to claim 6, wherein said frequency dividing means includes:
   (a) discriminating means for detecting a pilot signal that is mainly reproduced out of said pilot signals reproduced by said reproducing means; and
   (b) frequency dividing operation control means for controlling the frequency dividing operation of said frequency dividing means to have said comparison signal frequency divided into a frequency component similar to the frequency component of the pilot signal detected by said discriminating means.

8. An apparatus according to claim 6, wherein said information signal includes a color video signal.

9. An apparatus according to claim 8, wherein said removing means includes:
   (a) a separating circuit for separating said color video signal into a chominance signal and a luminance signal; and
   (b) a time-base fluctuation removing circuit for removing the time-base fluctuations of said chrominance signal separated by said separating circuit according to the phase difference detected by said second phase difference detecting means.

10. A reproducing apparatus for reproducing a recording from a record bearing medium on which a plurality of different pilot signals having different frequencies are recorded with information signals, comprising:
    (a) reproducing means for reproducing said pilot signals with said information signals recorded on said record bearing medium;
    (b) frequency signal generating means for generating a frequency signal of a frequency which is in a common-multiple relation to the frequencies of said plurality of different pilot signals;
    (c) control means for controlling a center frequency of said frequency signal generated by said frequency signal generating means, said control means being arranged to be accomplished according to said pilot signals reproduced by said reproducing means;
    (d) reference signal generating means for generating a reference signal;
    (e) comparison means arranged to compare said reference signal produced from said reference signal generating means with said frequency signal generated from said frequency signal generating means to obtain a comparison signal; and
    (f) removing means for removing time-base fluctuation components of said information signals reproduced by said reproducing means in accordance with said comparison signal produced by said comparison means.

11. An apparatus according to claim 10, wherein the pilot signals reproduced by said reproducing means include time-base fluctuation components which are generated during the reproducing operation of said reproducing means.

12. An apparatus according to claim 10, wherein said control means includes:

(a) a frequency dividing circuit for dividing the frequency of said frequency signal generated by said frequency signal generating means so as to form a plurality of frequency divided signals each having a different frequency;

(b) a frequency dividing operation control circuit arranged to detect the kind of each of said pilot signals reproduced by said reproducing means and to select one of the frequency divided signals formed by said frequency dividing circuit according to the result of said detection; and (c) phase comparing means arranged to compare the phases of the pilot signals reproduced by said reproducing means with those of the frequency divided signals produced from said frequency dividing circuit and to control said frequency signal generating means according to the result of said comparison.

13. A reproducing apparatus for reproducing a recording from a magnetic tape bearing four kinds of pilot signals each having a different frequency multiplied into information signals in a predetermined rotation, comprising:

(a) rotary magnetic head means for reproducing signals recorded in recording tracks by tracing a surface of said magnetic tape;

(b) separating means for separating the reproduced signals of said rotary magnetic head means into said pilot signals and said information signals;

(c) comparison signal generating means for generating a comparison signal having a frequency which is in a common-multiple relation to said four different frequencies of pilot signals;

(d) frequency dividing means arranged to frequency divide said comparison signal to generate thereby frequency signals having four different frequencies;

(e) switching means for shifting the output of said frequency dividing means from one output to another by detecting the kinds of the pilot signals separated by said separating means and by performing said switching operation according to the result of said detection;

(f) control means arranged to compare the phase of the pilot signals reproduced by said rotary head means with that of the frequency signals produced by said frequency dividing means, and to control said comparison signal generating means according to the result of said comparison;

(g) reference signal generating means for generating a reference signal;

(h) phase difference detecting means arranged to compare the phase of said reference signal generated by said reference signal generating means with the phase of the comparison signal generated by said comparison signal generating means and to produce a phase difference signal as a result of said comparison;

(i) low frequency component removing means arranged to remove a low frequency component of said phase difference signal produced from said phase difference detecting means; and (j) correcting means arranged to correct the phase of the information signals reproduced by said rotary magnetic head means by using an output of said phase difference detecting means after the low frequency component is removed from said output by said low frequency component removing means.

14. An apparatus according to claim 13, wherein said low frequency component removing means includes a low-cut filter.

15. A reproducing apparatus for reproducing an information signal from a record bearing medium in which different kinds of pilot signals are recorded continuously together with the information signal on recording tracks, comprising:

(a) reproducing means for tracing said recording tracks formed on said record bearing medium and for continuously reproducing said information signal and said pilot signals recorded in said recording tracks;

(b) reference signal generating means for generating a reference signal;

(c) comparison means arranged to generate a phase synchronized signal which is synchronized in phase with pilot signals continuously reproduced by said reproducing means, to compare said phase synchronized signal with the reference signal generated by said reference signal generating means and to output a comparison signal in response to a result of the comparison;

(d) eliminating means for eliminating a time-base fluctuation component of said information signal reproduced by said reproducing means in accordance with said comparison signal produced from said comparison means; and (e) control means for controlling an operation of tracing the recording tracks formed on said record bearing medium by said reproducing means, so that said reproducing means exactly reproduces the recording tracks formed on said record bearing medium by using the pilot signals continuously reproduced by said reproducing means.

* * * * *